United States Patent
Stellato et al.

(10) Patent No.: US 7,262,943 B2
(45) Date of Patent: *Aug. 28, 2007

(54) CONFIGURATION UNIT AND METHODS FOR CONFIGURING CENTRALLY CONTROLLED POWER DISTRIBUTION SYSTEMS

(75) Inventors: Flaviano Stellato, Ontario (CA); Hong-Ping Liu, Ontario (CA); Dmitry Matskevitch, Toronto (CA); David G Fletcher, Simsbury, CT (US)

(73) Assignee: General Electric Company, Schenectady, NY (US)

( * ) Notice: Subject to any disclaimer, the term of this patent is extended or adjusted under 35 U.S.C. 154(b) by 639 days.

This patent is subject to a terminal disclaimer.

(21) Appl. No.: 10/662,972

(22) Filed: Sep. 15, 2003

(65) Prior Publication Data

US 2005/0057870 A1    Mar. 17, 2005

(51) Int. Cl.
*H02H 3/00* (2006.01)
(52) U.S. Cl. ............................................. 361/62
(58) Field of Classification Search ............ 361/115, 361/62
See application file for complete search history.

(56) References Cited

U.S. PATENT DOCUMENTS

| | | | |
|---|---|---|---|
| 5,367,427 A | 11/1994 | Matsko et al. | 361/94 |
| 5,437,163 A | 8/1995 | Jurewicz et al. | 62/126 |
| 5,672,943 A | 9/1997 | Vivers | 318/103 |
| 6,433,981 B1* | 8/2002 | Fletcher et al. | 361/93.1 |
| 6,847,297 B2* | 1/2005 | Lavoie et al. | 340/540 |
| 6,968,277 B2* | 11/2005 | Fletcher et al. | 702/60 |

FOREIGN PATENT DOCUMENTS

| | | |
|---|---|---|
| DE | 29706969 | 4/1997 |
| WO | WO 00/34835 | 6/2000 |

* cited by examiner

*Primary Examiner*—Stephen W. Jackson
(74) *Attorney, Agent, or Firm*—Ohlandt, Greeley, Ruggiero & Perle, L.L.P.

(57) ABSTRACT

A configuration unit for a centrally controlled power distribution system is provided. The configuration unit includes a non-volatile memory device and a communications connection. The non-volatile memory device is permanently secured within a switchgear cubicle. The cubicle replaceably receives a circuit breaker and removably receives a module. The communications connection places the non-volatile memory device in communication with the module when the module is removably received in the switchgear cubicle.

23 Claims, 6 Drawing Sheets

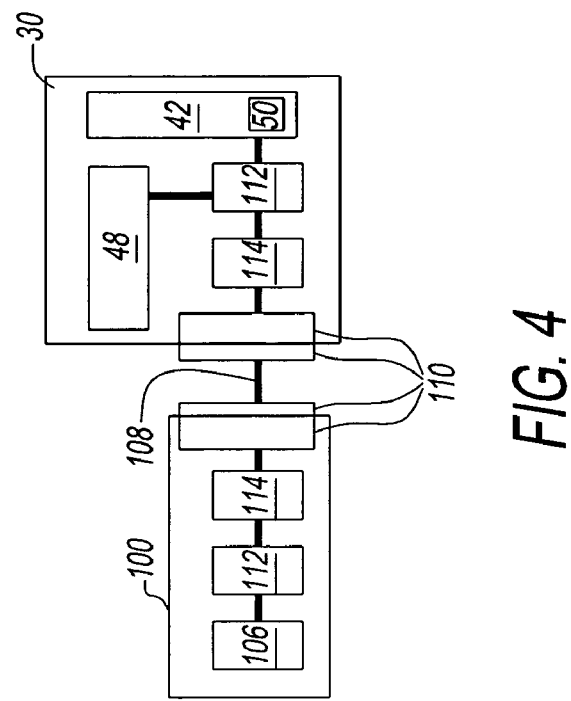
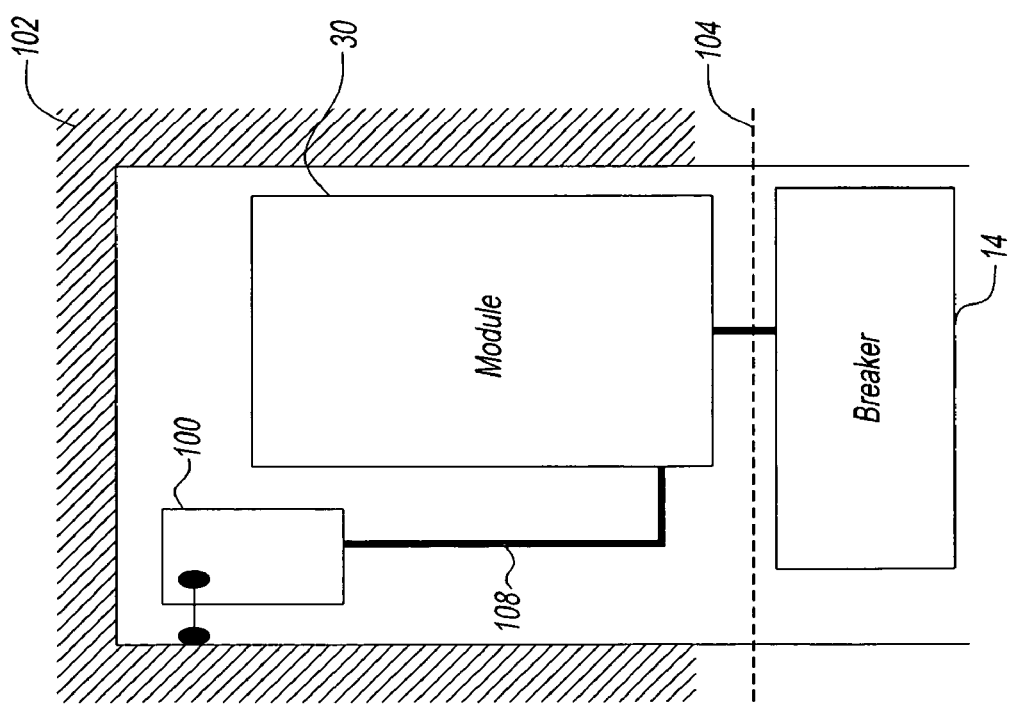
FIG. 4
FIG. 3

CONFIGURATION UNIT AND METHODS FOR CONFIGURING CENTRALLY CONTROLLED POWER DISTRIBUTION SYSTEMS

BACKGROUND OF INVENTION

The present disclosure relates to centrally controlled power distribution systems. More particularly, the present disclosure relates to configuration units and methods for configuring centrally controlled power distribution systems.

Power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined over-current without damage to itself when properly applied within its rating. The circuit breakers commonly include supplementary protectors enclosed within the body of the circuit breaker. One common type of supplementary protector is known as an electronic trip unit. The circuit breaker and its supplementary protector have proven useful at managing the protection of the loads on the circuit.

It can be desired to integrate the load management of the branch circuits to one another. Further, it can be desired to integrate the management of the loads on the branch circuits with the management of the power feeds feeding the branch circuits. Still further, it can be desired to provide for monitoring of the system. However, the development of such centrally controlled power distribution systems has been hindered by one or more practical attributes of the system, such as, configuration of various system components of the system.

Accordingly, there is a continuing need for configuration units and methods of configuring components of centrally controlled power distribution systems.

BRIEF DESCRIPTION OF THE INVENTION

A configuration unit for a centrally controlled power distribution system is provided. The configuration unit includes a non-volatile memory device and a communications connection. The non-volatile memory device is permanently secured within a switchgear cubicle. The cubicle replaceably receives a circuit breaker and removably receives a module. The communications connection places the non-volatile memory device in communication with the module when the module is removably received in the switchgear cubicle.

A protection system for a power distribution system is also provided. The protection system includes a central computer, a first switchgear cubicle, a first data module, and a data network. The first cubicle has a first non-volatile memory device permanently secured therein. The first non-volatile memory has first configuration data resident thereon. The first data module communicates with a first circuit breaker of the power distribution system. The first data module is removably received in the first switchgear cubicle and the first circuit breaker is replaceably received in the first switchgear cubicle. The first data module communicates with the first non-volatile memory device so that the first data module is configured by the first configuration data. The data network communicates between the central computer and the first data module so that the processing unit performs primary power distribution functions for the power distribution system.

Further provided is a method of configuring components of a centrally controlled power distribution system. The method includes causing a data module to read configuration data from a configuration unit, the configuration unit being permanently attached to a switchgear cubicle and the data module being removably received in the switchgear cubicle; and creating a working copy of the configuration data in the data module.

BRIEF DESCRIPTION OF THE DRAWINGS

FIG. 3 is a block diagram of an exemplary embodiment of a configuration unit according to the present disclosure;

FIG. 4 is a schematic view of the configuration unit of FIG. 3;

DETAILED DESCRIPTION

Figure 1:
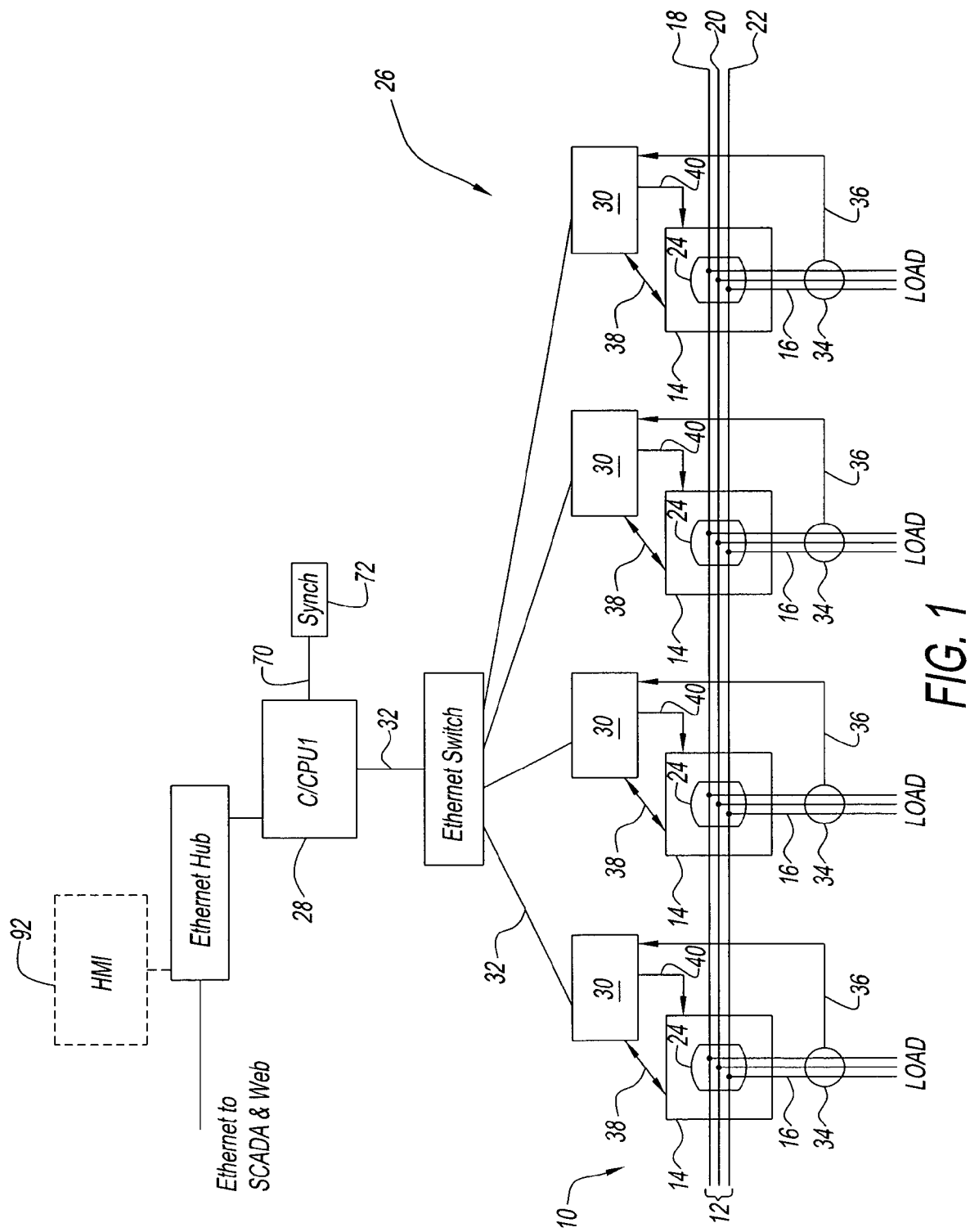
FIG. 1 is a schematic view of an exemplary embodiment of a centrally controlled protection, monitoring, and control system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14. In addition, it is also contemplated by the present disclosure for circuit breakers 14 in system 10 to have any selected topology such as, but not limited to a series configuration, a parallel configuration, and any combinations thereof.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 may perform some or all primary power distribution functions for power distribution system 10. Namely, CCPU 28 performs all instantaneous overcurrent protection (IOC), short time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for preventing collisions.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
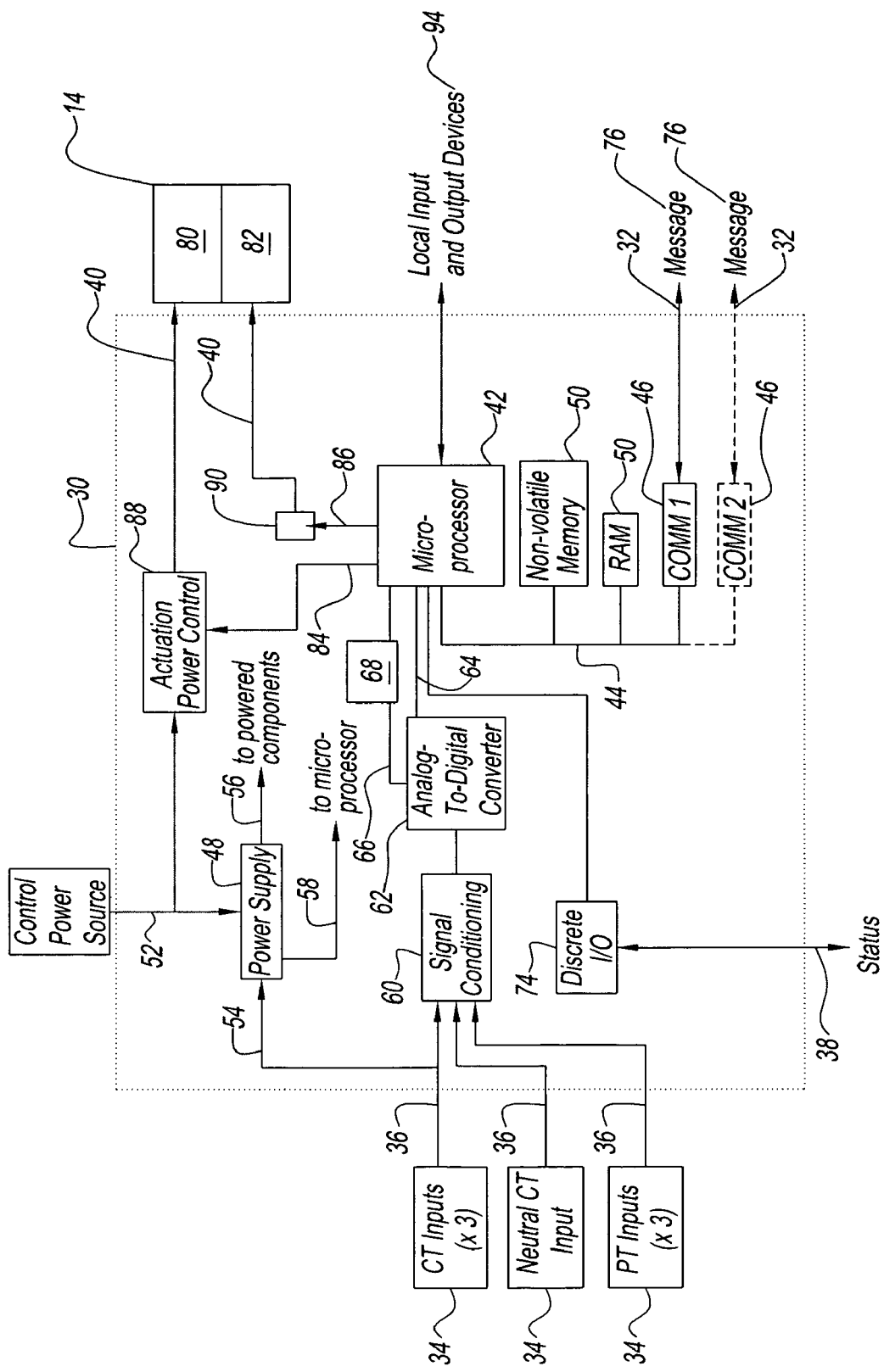
FIG. 2 is a schematic view of an exemplary embodiment of a data sample and transmission module.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptable power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a pre-determined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to a specified condition such as, but not limited to a detected overcurrent regardless of the state of first and second sources 52, 54. Additionally, a lockout device can be provided that is operably connected to circuit breaker 14.

Modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system.

It has been found that centralization of control in system 26 at CCPU 28 provides the ability to design circuit breaker 14 and/or module 30 in more standardized fashion than was possible with the circuit breakers of prior systems. For example, over one hundred separate circuit breaker sizes have been needed to protection of the current loads available in various power distribution systems. Advantageously, the generic nature of circuit breaker 14 can drastically reduce this number. Unfortunately, the generic nature of circuit breaker 14 and module 30 has led to a need to configure these devices as they are assembled and/or retrofitted.

Thus, the present disclosure provides for a switchgear configuration unit and methods of configuring breaker 14 and/or module 30 that takes full advantage of the generic nature of the circuit breaker and/or the module made possible by system 26.

Referring now to FIGS. 3 and 4, an exemplary embodiment of a switchgear configuration unit 100 is illustrated. In system 26, configuration unit 100 is permanently secured within a switchgear cubicle 102. Cubicle 102 is a stationary or fixed portion of protection system 26, such as in a breaker cabinet (not shown). Breaker 14 is replaceably positioned in cubicle 102, while module 30 is removably positioned in the cubicle. For purposes of clarity, a line 104 is used to clarify the portions of system 26 that are replaceable in cubicle 102 (e.g., those below line 104) from the portions that are removable from the cubicle (e.g., those above line 104).

As used herein, the term "permanent" shall mean that the device is installed at the time of manufacture and remains in place for the life of the switchgear. For example, in one embodiment configuration unit 100 is tethered to cubicle 102 by way of a screw. Permanently attaching configuration unit 100 to cubicle 102 allows the configuration unit 100 to remain in place in the cubicle when other devices such as the module are replaced. Accordingly, permanently attaching configuration unit 100 to cubicle 102 allows the configuration unit to remain in the cubicle for the life of the configuration unit. In addition, the term "removable" shall mean those devices that can be removed from cubicle 102 through disassembly of the cubicle and/or the device. In contrast, the term "replaceable" shall mean that the devices that can be easily removed from cubicle 102 without requiring disassembly of the cubicle and/or without the need for tools. In the present disclosure, configuration unit 100 is permanent, breaker 14 is replaceable, while module 30 is removable.

The replaceable construction of breaker 14 is commonly known in the switchgear art as a "draw-out construction", where the breaker is installed on a racking mechanism (not shown) within cubicle 102. The racking mechanism allows breaker 14 to be drawn in and out of cubicle 102 without disassembly of the cubicle and/or with the need for tools. Of course, other mechanism for replaceably positioning breaker 14 in cubicle 102 are contemplated by the present disclosure.

Configuration unit 100 is preprogrammed with the configuration data. The configuration data can include the physical characteristics of the circuit, the protection algorithms for the circuit, the network address of module 30, and any combinations thereof. For example, configuration unit 100 can include configuration data detailing the frame size for each breaker 14, the rating for each sensor 34, the network addressing means of each module 30, the protection scheme for breaker 14, and others.

Configuration unit 100 can include non-volatile memory 106 that is programmed to include the aforementioned configuration data. During assembly, module 30 is installed in cubicle 102 so that the module is in communication with configuration unit 100. Once module 30 is in communication with configuration unit 100, the configuration data resident on the unit is available for reading by the module and/or for writing to by the module. Specifically, configuration unit 100 communicates with module 30 so that processor 42 in the module can read the configuration data from memory 106 and store this data on memory device 50.

In the embodiment illustrated in FIGS. 3 and 4, module 30 and configuration unit 100 can communicate over a conduit 108. Module 30, configuration unit 100, and conduit 108 can include connectors 110 that allow the module and the configuration unit to communicate. Module 30 and/or configuration unit 100 can also include a bi-directional buffer 112 for buffering of communications. In some embodiments, module 30 and/or configuration unit 100 can include a protection device 114 for isolating and protecting the module and configuration unit from one another.

Figure 6:
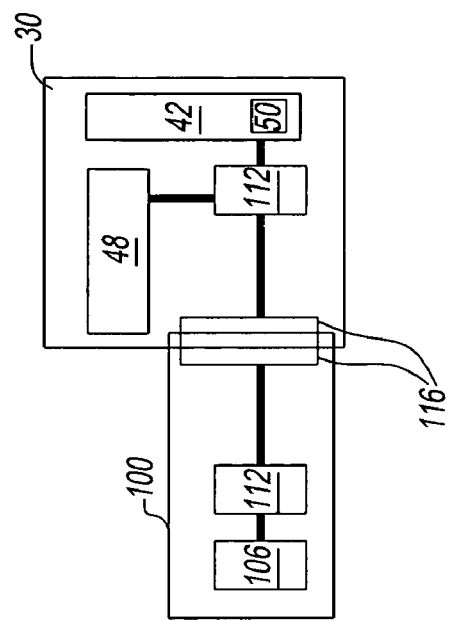
FIG. 6 is a schematic view of the configuration unit of FIG. 5.
Figure 5:
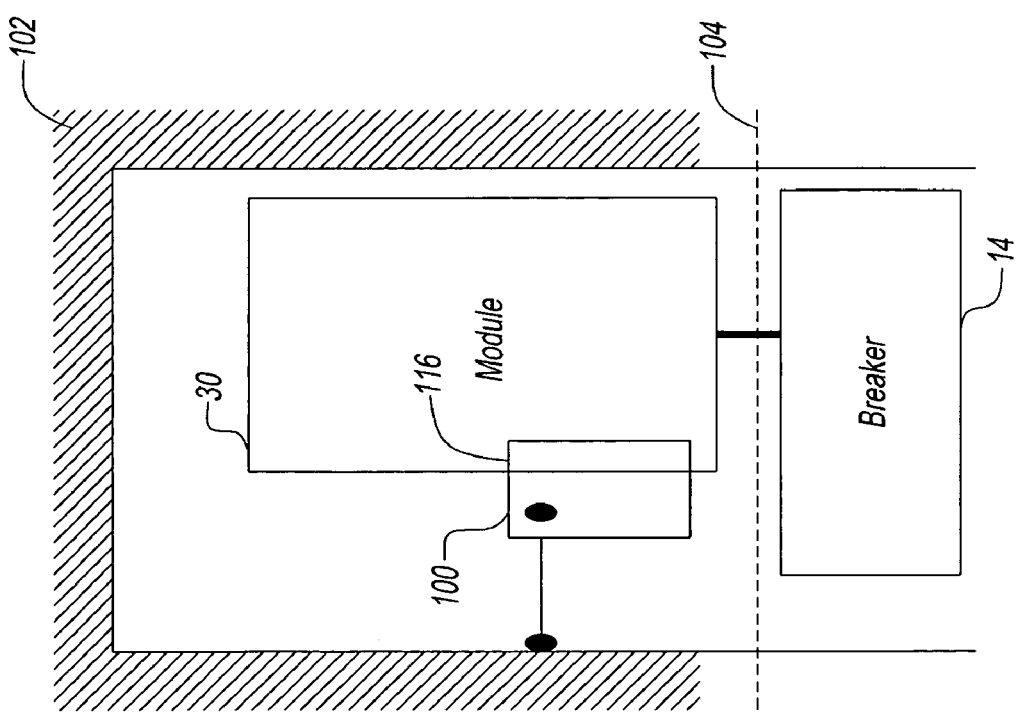
FIG. 5 is a block diagram of an alternate exemplary embodiment of a configuration unit.

An alternate embodiment of configuration unit 100 is illustrated in FIGS. 5 and 6. Here, module 30 and configuration unit 100 are illustrated communicating through a set of interconnecting plugs 116 disposed on the module and the configuration unit. However, it should be recognized that configuration unit 100 is described above by way of example communication over conduit 108 and plugs 116. Of course, it is contemplated for module 30 and configuration unit 100 to communicate across other known media and devices, such as, but not limited to wireless or infrared communication.

Since configuration unit 100 provides module 30 with the configuration data, it has been found that the module can be common for any combination of applications and sizes. Thus, it has been found that configuration unit 100 allows module 30 to be common for any application. This common module 30 allows for increased ordering simplicity for the module, reduced catalogue numbers for the module, fewer unique spare parts for customers, which can reduced downtime in the event of a failure of the module.

Configuration unit 100 also allows flexible configuration of the frame rating of cubicle 102, of the type of breaker 14, and of the rating of sensors 34. It has been found that configuration unit 100 allows the specific performance characteristics of system 26 to be attached to cubicle 102, and not to breaker 14 or module 30 as required by prior systems. Thus, configuration unit 100 allows breaker 14 to be a generic circuit interrupter as sensors 34 communicate with module 30 and not through breaker 14.

Figure 7:
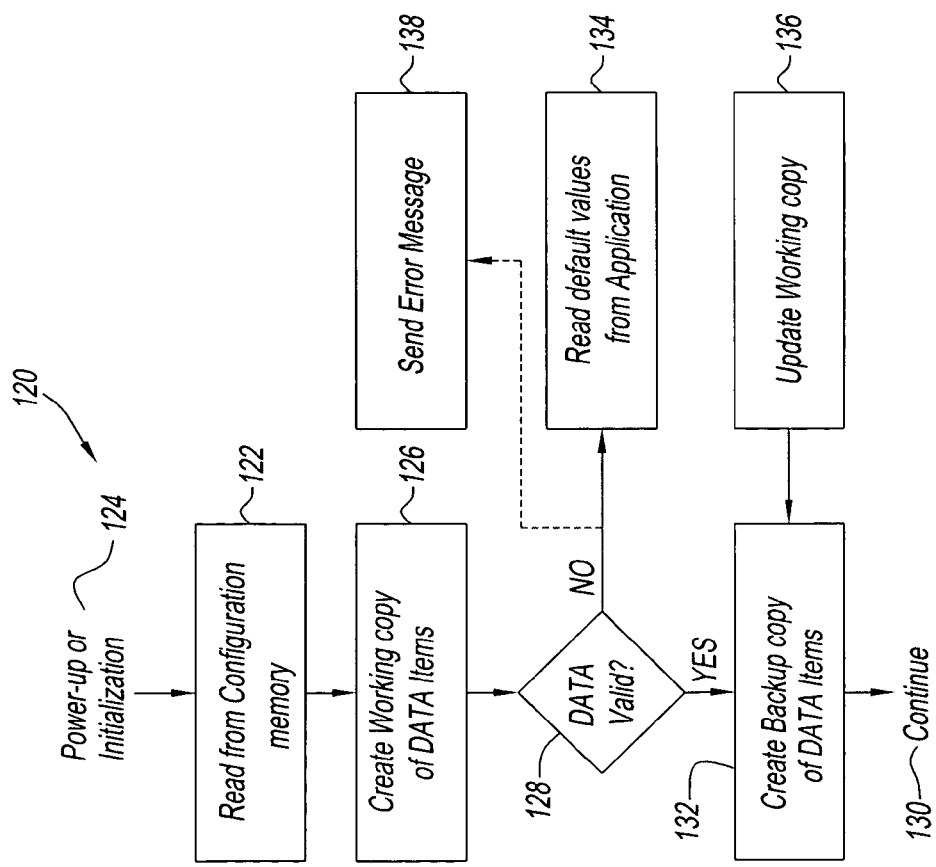
FIG. 7 is a firmware view of an exemplary method of configuring components of a centrally controlled power distribution system.

Referring now to FIG. 7, a method of configuring components of system 26 is generally referred to by reference numeral 120. Method 120 can include a reading step 122 that causes module 30 to read all configuration data from configuration unit 100 each time the module is powered up or initialized 124. Once read, method 120 creates a working copy 126 of the data and stores the working copy locally within memory device 50 of module 30.

Method 120 can include a validation step 128 that validates or checks working copy 126 received from configuration unit 100. Validation step 128 can be a standard data validation protocol, such as a cyclic redundancy check (CRC). Validation step 128 can be used to verify that the block of data that was sent is of the same size as the block of data that was received. In some embodiments, validation step 128 can also be used to verify that the values in working copy 126 are within a pre-programmed range resident on module 30. The pre-programmed range can be dependent on or independent of working copy 126.

If validation step 128 determines that working copy 126 is valid, method 120 allows module 30 to continue operation in a normal mode 130. In some embodiments, method 120 creates a backup copy 132 of the data and stores this backup copy locally within module 30 before continuing to operate in normal mode 130.

If validation step 128 determines that working copy 126 is not valid, method 120 can read default values 134 from module 30. Once default values 134 are read, method 120 creates an updated working copy 136 from default values 134 and stores the updated working copy locally within memory device 50. In some embodiments method 120 creates backup copy 132 of the updated working copy 136 before continuing to operate in normal mode 130.

In other embodiments, method 120 can send an error message 138 to CCPU 28. Error message 138 can inform CCPU 28 that working copy 126 from configuration unit 100 has not been validated and, thus, can indicate to the CCPU that module 30 is operating using default values 134.

In this manner, method 120 ensures that configuration unit 100 provides module 30 with the configuration data every time the module is initialized.

Figure 8:
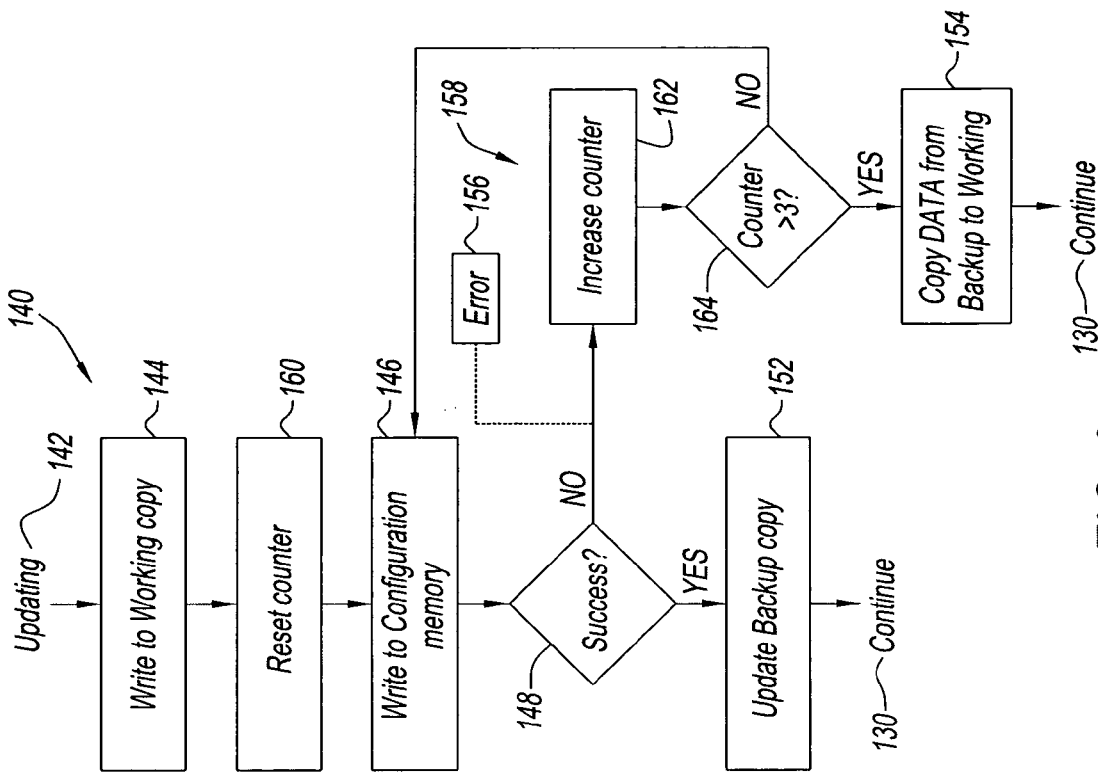
FIG. 8 is a firmware view of a second exemplary method of configuring components of a centrally controlled power distribution system.

Referring now to FIG. 8, an alternate method of configuring components of system 26 is generally referred to by reference numeral 140. Method 140 allows a user to update or adjust configuration data in configuration unit 100 as desired.

Method 140 creates an updated or adjusted configuration data 142 in module 30. Updated data 142 can be entered at module 30 and/or at CCPU 28. In addition, updated data 142 can be entered at any computer in communication with data network 32 such as, but not limited to, a manufacturing data management system controller. Once updated data 142 is entered, method 140 writes the updated data to a working copy 144. Working copy 144 is stored locally within memory device 50 of module 30. Method 140 then writes or sends working copy 144 to memory 106 of configuration unit 100 at step 146. In this manner, the configuration data on configuration unit 100 can be modified as desired.

Method 140 can also include a validation step 148 that validates or checks that working copy 144 is received by configuration unit 100 at step 146. Validation step 148 can be a standard data validation protocol, such as a cyclic redundancy check (CRC). Validation step 148 verifies that step 146 is completed successfully. Namely, validation step 148 verifies that working copy 144 on module 30 is successfully written to memory 106 on configuration unit 100.

If validation step 148 determines that step 146 is successful, method 140 allows module 30 to continue operation in normal mode 130 using working copy 144. In some embodiments, method 148 creates an updated back-up copy 152 when validation step 148 determines that step 146 is successful.

However, if validation step 148 determines that step 146 is not successful, method 140 updates working copy 144 with data from a backup copy 154 resident on module 30. In this instance, method 140 allows module 30 to continue operation in normal mode 130 using backup copy 154. Thus, method 140 can ensure that the configuration data resident on configuration unit 100 and module 30 conform to one another.

In some embodiments, method 140 can send an error message 156 to CCPU 28. Error message 156 can inform CCPU 28 that the intended changes to the configuration data on configuration unit 100 has not been successfully completed and, thus, can indicate to the CCPU that module 30 is operating using backup copy 154.

In other embodiments, method 140 can include a counting routine 158 that allows module 30 multiple attempts at sending working copy 144 (e.g., multiple steps 146) to configuration module 100 before using backup copy 154. In the illustrated embodiment, method 140 resets a counter 160 to zero before step 146. Counter 160 is incremented at step 162 for each unsuccessful attempt at sending step 146. Method 140 continues attempting sending step 146 until the counter is incremented to a selected number of attempts 164, such as, three attempts. Once counting routine 158 determines that selected number of attempts 164 has been met, method 140 begins using backup copy 154 as described above.

Of course, it is also contemplated for method 120 to include counting routine 158 that allows module 30 multiple attempts at reading working copy 126 (e.g., multiple steps 122) from configuration module 100 before using default values 134.

Figure 9:
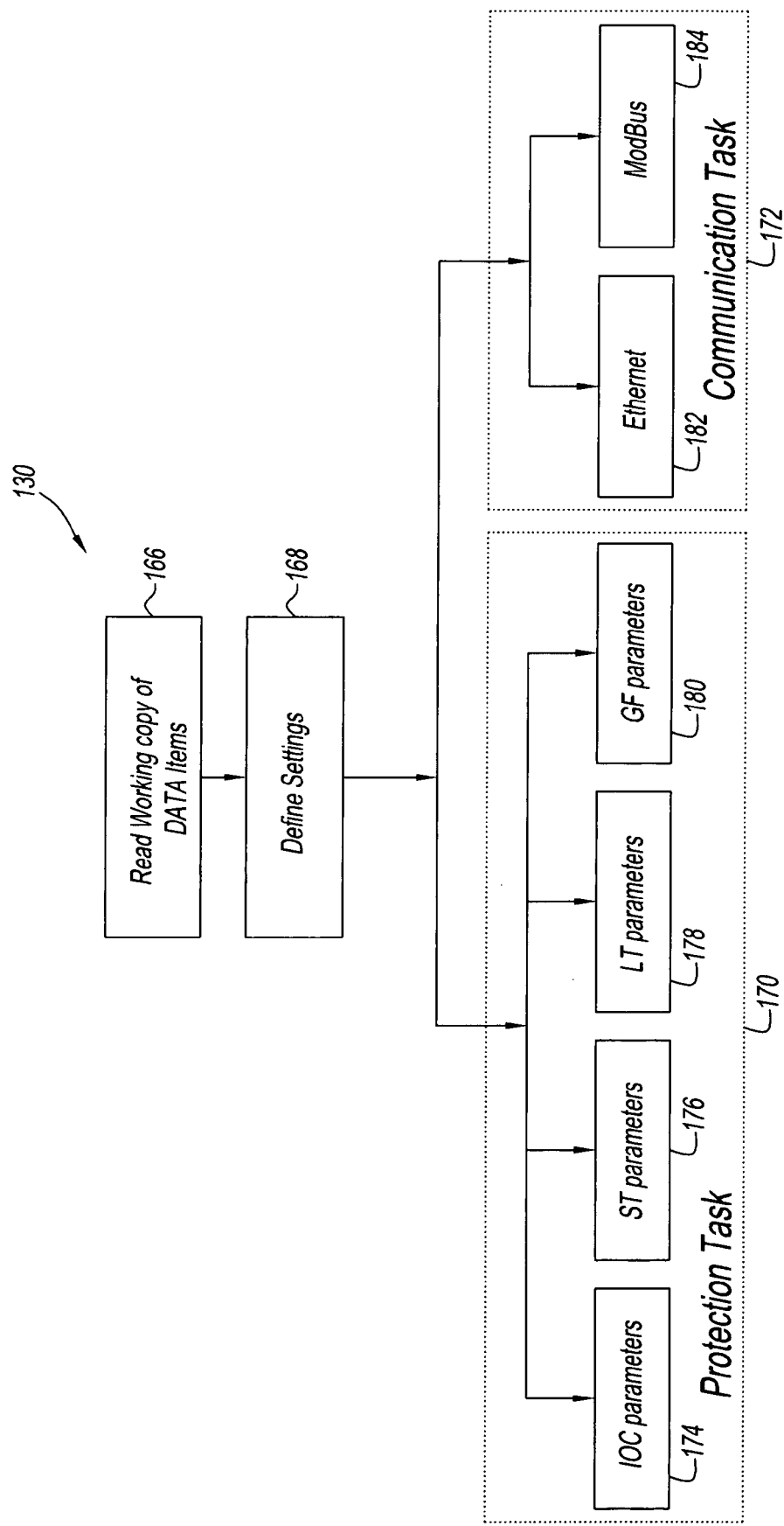
FIG. 9 is an application view of another exemplary method of configuring components of a centrally controlled power distribution system.

Normal mode 130 is described with reference to FIG. 9, which illustrates the normal mode from an application perspective, namely from the view of module 30. Normal mode 130 includes a data reading step 166 and a setting definition step 168. During reading step 168, module 30 reads the configuration data present in working copy 126, 144 provided by methods 120, 140, respectively. Module 30 defines protection tasks 170 and communication tasks 172 based on the configuration data present in working copy 126, 144. For example, in normal mode 130 the module 30 utilizes the configuration data present in working copy 126, 144 to determine the instantaneous over current (IOC) parameters 174, the short time over current (ST) parameters 176, the long time over current (LT) parameters 178, the ground fault (GF) parameters 180, and any combinations thereof. Further, in normal mode 130 the module 30 utilizes the configuration data present in working copy 124, 144 to determine the Ethernet parameters 182, the communication bus parameters 184, and any combinations thereof.

In this manner, each module 30 can define its protection tasks 170 and communication tasks 172 based on the configuration data available in configuration unit 100. Using method 120, each module 30 can define its protection and communication tasks 170, 172 at initialization of system 26. Further, each module 30 can redefine its protection and communication tasks 170, 172 when modified by a user using method 140.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A configuration unit for a centrally controlled power distribution system, comprising:
    a non-volatile memory device permanently secured within a switchgear cubicle, said switchgear cubicle being configured to replaceably receive a circuit breaker and to removably receive a module;
    means for placing said non-volatile memory device in communication with said module when said module is removably received in said switchgear cubicle; and
    configuration data resident on said non-volatile memory device, wherein said configuration data comprises data selected from the group consisting of physical characteristics of a circuit, protection algorithms for said circuit, a network addressing means of said module, and any combinations thereof.

2. The configuration unit as in claim 1, wherein said means for placing said non-volatile memory device in communication with said module comprises a conduit connecting said non-volatile memory device with said module.

3. The configuration unit as in claim 1, wherein said means for placing said non-volatile memory device in communication with said module comprises a set of interconnecting plugs disposed on said module and said non-volatile memory device.

4. The configuration unit as in claim 3, wherein said set of interconnecting plugs connect being connected when said module is removably received in said switchgear cubicle.

5. A protection system for a power distribution system, comprising:
    a central computer;
    a first switchgear cubicle having a first non-volatile memory device permanently secured therein, said first non-volatile memory device having first configuration data resident thereon;
    a first data module in communication with a first circuit breaker of the power distribution system, said first data module being removably received in said first switchgear cubicle and said first circuit breaker being replaceably received in said first switchgear cubicle, said first data module being in communication with said first non-volatile memory device so that said first data module is configured by said first configuration data; and
    a data network communicating between said central computer and said first data module so that said central computer performs primary power distribution functions for the power distribution system.

6. The protection system as in claim 5, wherein said first configuration data comprises data selected from the group consisting of physical characteristics of said first circuit breaker, protection algorithms for said first circuit breaker, a network address of said first data module, and any combinations thereof.

7. The protection system as in claim 5, further comprising:
    a second switchgear cubicle having a second non-volatile memory device permanently secured therein, said second non-volatile memory device having second configuration data resident thereon; and
    a second data module in communication with a second circuit breaker of the power distribution system, said second data module being removably received in said second switchgear cubicle and said second circuit breaker being replaceably received in said second switchgear cubicle, said second data module being in communication with said second non-volatile memory device so that said second data module is configured by said second configuration data,
    wherein said data network communicates between said central computer and said first and second data modules so that said processing unit performs primary power distribution functions for the power distribution system.

8. The protection system as in claim 7, wherein said second configuration data comprises data selected from the group consisting of physical characteristics of said second circuit breaker, protection algorithms for said second circuit breaker, a network address of said second data module, and any combinations thereof.

9. The protection system as in claim 5, further comprising a conduit placing said first non-volatile memory device with said first data module.

10. The protection system as in claim 5, further comprising a set of interconnecting plugs placing said first non-volatile memory device with said first data module when said first data module is removably received in said first switchgear cubicle.

11. A method of configuring components of a centrally controlled power distribution system, comprising:
    causing a data module to read configuration data from a configuration unit, said configuration unit being permanently attached to a switchgear cubicle and said data module being removably received in said switchgear cubicle; and
    creating a working copy of said configuration data in said data module.

12. The method as in claim 11, wherein said data module reads said configuration data from said configuration unit each time said data module is initialized.

13. The method as in claim 11, further comprising causing said data module to define a module parameter based on said configuration data.

14. The method as in claim 13, wherein said module parameter comprises a parameter selected from the group consisting of an instantaneous over current parameter, a short time over current parameter, a long time over current parameter, a ground fault parameter, an Ethernet parameter, a communication bus parameter, and any combinations thereof.

15. The method as in claim 11, further comprising validating said working copy.

16. The method as in claim 15, wherein said validation comprises verifying that a block of data read from said configuration unit is of the same size as a block of data that was received by said data module.

17. The method as in claim 15, wherein said validation comprises verifying that a plurality of values in said working copy are within a pre-programmed range resident on said data module.

18. The method as in claim 17, wherein said pre-programmed range is independent or dependent of said working copy.

19. The method as in claim 15, further comprising reading default values from said data module if said working copy is not validated.

20. The method as in claim 15, further comprising sending an error message from said data module if said working copy is not validated.

21. The method as in claim 11, further comprising
creating an updated configuration data in said data module;
writing said updated configuration data to said working copy;
sending said working copy to said configuration unit such that said configuration data is updated by said updated configuration data.

22. The method as in claim 21, further comprising validating that said configuration data is updated by said updated configuration data.

23. The method as in claim 21, wherein said updated configuration data is created in a computer in electrical communication with said data module.

* * * * *